United States Patent [19]

Sadeghi et al.

[11] Patent Number: 5,017,281
[45] Date of Patent: May 21, 1991

[54] TREATMENT OF CARBONACEOUS MATERIALS

[75] Inventors: Mohammad-Ali Sadeghi, Pasadena; Kazem Sadeghi, Goleta; Jih-Fen Kuo, Los Angeles; Long-Kuan Jang, Long Beach; Teh F. Yen, Altadena, all of Calif.

[73] Assignee: Tar Sands Energy Ltd., Santa Barbara, Calif.

[21] Appl. No.: 358,636

[22] Filed: May 30, 1989

Related U.S. Application Data

[62] Division of Ser. No. 684,945, Dec. 21, 1984, Pat. No. 4,891,131.

[51] Int. Cl.$^5$ .............................................. C10G 1/04
[52] U.S. Cl. ........................................ 208/390; 134/1; 208/391
[58] Field of Search ...................... 208/390, 391; 134/1

[56] References Cited

U.S. PATENT DOCUMENTS

| | | | |
|---|---|---|---|
| 3,422,000 | 1/1969 | Bicherd | 208/390 |
| 3,969,220 | 7/1976 | Anderson et al. | 208/390 |
| 4,120,777 | 10/1978 | Globus | 208/391 |
| 4,151,067 | 4/1979 | Grow | 208/391 |
| 4,891,131 | 1/1990 | Sadeghi et al. | 208/390 |

FOREIGN PATENT DOCUMENTS 756078 4/1967 Canada ............................. 208/390

Primary Examiner—Asok Pal
Attorney, Agent, or Firm—Marvin E. Jacobs

[57] ABSTRACT

Hydrocarbon liquids are recovered from carbonaceous materials such as tar sands utilizing a separation reagent formed in situ by reacting polar resin components of tar sands with an inorganic base such as sodium silicate in sonicated aqueous solution in absence of an organic solvent to form a surfactant. Under the influence of sonication a microemulsion of polar-external micelles forms. The polar groups can associate with anions, especially polyanions such as silicate and act in a membrane mimetic manner to form vesicles. Cavities can form in the surfactant resin molecule that complex with guest cations such as titanium or other metals from the tar sand.

When tar sands are added to the sonicated separation reagent, the surfactant penetrates the bitumen. Metal ions complex with the polar groups and aid in removing the bitument from the sand particles. The polarorganic asphaltene materials are carried into the aqueous phase by the anion and stabilized within the micelle structure. The lighter, non-polar hydrocarbon oil fraction separate from the emulsion and rise to the top and are recovered by skimming. The heavier asphaltenes and preasphaltenes complex with the polyvalent metals to form charcoal-like agglomerates which settle to the bottom of the treatment tank. The separation reagent forms during the reaction and can reach a concentration capable of dissolving bitumen. The separation reagent can be recovered and used in other processes after removal and recovery of the clay. The separation reagent must be substantially diluted after being recycled and reused to reduce solvation properties.

6 Claims, 5 Drawing Sheets

BILAMELLAR VESICLE*

*MULTILAYERS OF MEMBRANE WILL FORM MULTILAMELLAR VESICLE

TREATMENT OF CARBONACEOUS MATERIALS

This application is a divisional application of U.S. application Ser. No. 684,945 filed 12/21/84, U.S. Pat. No. 4,891,131.

TECHNICAL FIELD

The present invention relates to the treatment of carbonaceous materials, and, more particularly, to the recovery of hydrocarbon liquids from complex organic mixtures such as tar sands, oil shale, petroleum residues and the like.

The consumption of oil and gas represents about 80 percent of the consumption of fossil fuels in the United States. At the present time, about one-half of the electric power in the United States of America is generated from natural gas and petroleum. Fuels other than liquid and gaseous hydrocarbons, such as nuclear, hydrogen or methanol are being investigated as power sources other than internal combustion engines, such as fuel cells, photovoltaic cells or electric storage batteries. However, consumers are accustomed to using liquid fuels and the supply, distribution, power generation and transportation is expected to double by the year 2000. The United States is dependent on overseas fuel sources to supply its needs.

There are large deposits of tar sands and oil shale in the United States and Canada. The organic portion of tar sands and oil shale has a higher indigenous hydrogen content than coal. Tar sands and oil shale are potential sources of liquid fuel which would conserve the rapidly depleting petroleum and natural gas resources for other essential uses as a feedstock for the synthetic rubber and resin industries. The liquid hydrocarbon extraction from rock ores such as tar sands, oil shale or the like could also supply chemical intermediates or serve as a synthetic resin or rubber feedstock. However, utilization of these resources has been very limited by the low price of crude petroleum in the past and the difficulties and expense of recovering hydrocarbon material from these rock ores.

The deposit of oil shale in the Green River formation in the western United States is considered by many as second only to coal as the largest potential source of fuel in the energy future of the United States. In addition, because of its high indigenous hydrogen content, it is considered superior to coal as a potential feedstock for conversion into liquid fuels. The organic matter in oil shale is conventionally separated by retorting from the inorganics with which it is associated. Temperatures sufficient to crack the organics are used, and an unstable crude shale oil with a high nitrogen content is recovered. Solvent extraction to recover the bitumen, followed by pyrolysis to liquefy the kerogen has been considered. However, the non-porous nature of the shale rock results in low mass transfer rate and penetration of solvent into the rock, and fine rock particles break off and disperse into the solvent phase. Retorting and/or solvent extraction of oil shale has not yet proven capable of producing a cost competitive fuel. The present decreases in the price of crude petroleum have reduced at least the short term commercial potential of all synfuels.

Tar sands, also called oil sands or bituminous sands, are essentially silicious materials such as sands, sandstones or diatomaceous earth deposits impregnated with about 5 to 20 percent by weight of a dense, viscous, low gravity bitumen. The mineral component also contains clay, usually illite, and small amounts of metals such as iron, titanium and nickel. Deposits of tar sands exist throughout the world, usually adjacent to petroleum reserves but closer to the surface. Major deposits are present on the North American continent, in the Athabasca region of Northern Alberta, Canada, in the Uinta Basin near Vernal in Northeastern Utah, and in the Santa Maria region along the central coast of California, particularly the Sisquoc River Valley near Casmalia. It has been estimated that the Athabasca deposit contains in excess of one billion barrels of bitumen.

Bitumen can be recovered by stripping away the overburden and processing the tar sands ore on the surface. Bitumen can also be recovered in deeper deposits by in situ methods. The in situ methods include fire flooding and steam flooding. These methods recover only a small percentage of the available fuel in the deposit since fire flooding combusts a significant amount of the bitumen and steam flooding leaves behind a large percentage of the available bitumen. These sub-surface methods require extensive environmental controls to prevent air, land and water pollution. Furthermore, the low grade crude recovered contains high amounts of asphaltene, preasphaltene, and heteroatoms and heavy metals. The crude must be upgrade and refined at added cost before it is in usable form as a fuel.

Direct coking of tar sands has been tested using a fluidized bed technique. There are two major disadvantages to this process. First, the large amounts of sand circulated, relative to the oil throughput, produce abrasion and contribute to material handling problems. Secondly, the sand is discharged from the process at 400° F., representing a significant heat loss.

Bitumen is much easier to separate from sand than kerogen is from shale and numerous processes have been proposed based on use of hot water, cold water, solvents or combinations to separate the bitumen from the mineral portion. Solvent extraction recovers a high grade and percentage of available bitumen but the loss of solvent, even with "closed system" recovery and recycling, renders the process uneconomical. Hot water requires heat and mixing to accomplish separation of the bitumen and usually surfactants or solvents are also utilized. A low grade bitumen containing heavy metal impurities is recovered. Cold water is incapable of separating the bitumen unless solvent, surfactants or other reagent capable of breaking the attachment of the bitumen to the sand particles is added to the water.

The only present commercial production of a fuel from mined tar sands are the Suncor and Syncrude plants in Alberta, Canada. These utilize hot water solvent processes to recover the bitumen. It is difficult to upgrade and refine the recovered material to remove metals and clay impurities. The solvent is recovered by centrifugation. The refined product is not cost competitive with well crude and cannot be produced at a profit without a subsidy. It is estimated that the Alberta and Canadian governments provide significant tax and other subsidies to the operation of the plants. These processes require abundant supplies of quality water and adversely impact the air, land and water environments despite extensive and costly pollution controls.

BACKGROUND ART

One approach to processing tar sands that has been extensively investigated is the use of alkaline reagents such as alkali metal silicates, phosphates, carbonates or hydroxides as a bitumen separation reagent at elevated temperature or in presence of a solvent. Fyleman (U.S. Pat. No. 1,615,121) treats tar sand with dilute aqueous solution of alkali carbonate, hydroxide or silicate heated from 60° to 80° C. Clark (U.S. Pat. No. 1,791,797) adds a polyvalent salt such as a calcium or aluminum salt to the alkaline reagent as a coagulant. U.S.S.R. Patent No. 2,924,772 mixes an aqueous suspension of tar sands with diesel alkaline waste, separates and adds sodium silicate to the lower phase, combines it with the upper phase to form a second upper phase. Willard, Sr. (U.S. Pat. No. 3,951,778) also discloses use of a hot (40° C.-90° C.) aqueous silicate solution containing calcium and magnesium which additionally contains a micelle forming surfactant such as metal soap. Fischer (U.S. Pat. No. 2,903,407) stored an aqueous suspension of tar sand at ambient temperature (60° F.-160° F.) before adding hydrocarbon solvent and mixing at elevated temperature. Bauer et al (U.S. Pat. No. 2,453,060) adds sodium silicate or carbonate to an aqueous suspension of tar sands prior to hot pulping; solvent is then added. Stegmemeir et al (U.S. Pat. No. 2,924,565), Vaell et al (U.S. Pat. No. 2,924,566), Sherbourne (U.S. Pat. No. 2,921,010), Fischer (U.S. Pat. No. 2,957,818), Kelly (U.S. Pat. No. 2,980,600) and Sheffel et al (U.S. Pat. No. 3,075,913) are all commonly assigned and relate to improvements in a process in which bitumen is separated from tar sand by pulping a warm silicate-solvent solution in a rotary kiln pulper. Richard (U.S. Pat. No. 3,330,757) and Cannevari (U.S. Pat. No. 3,331,768) use an aqueous treating solution containing a transfer agent such as a phosphate, a silicate and a chelating agent and/or a demulsifier to separate bitumen from tar sand. Floyd et al (U.S. Pat. No. 3,401,110) disclose the hot water process for treating tar sands and teaches the cold water process requires the use of a light hydrocarbon solvent in order to achieve a reasonably good separation.

Most processes employ some form of mixing during the separation step. U.S. Pat. Nos. 4,054,505 and 4,054,506 disclose sonicating a dispersion of tar sand in solvent having sufficient strength to break apart and to remove bitumen from the surfaces of the sand grains.

All of these processes require use of heat and/or solvent in order to separate bitumen from tar sand. In our earlier experiments it was surprisingly discovered that bitumen can be separated from tar sands at ambient temperature using dilute aqueous solution of inorganic bases such as sodium silicates by subjecting the suspension to vigorous mixing, for example, in the vortex of a mixer imparting turbulence and high shear to the suspension. A portion of the bitumen was recovered after several days of treatment. A small amount of oil with a high ash content was recovered from the top of the suspension.

STATEMENT OF THE INVENTION

A novel process for separating hydrocarbon liquids from carbonaceous materials is provided in accordance with the invention. The process of the invention operates at ambient temperature not requiring an external source of heat. A clean separation of hydrocarbon is refined during the separation step since the heavy metal and ash content of the recovered hydrocarbon is extremely low. Upgrading also occurs as a result of deasphalting.

The process of the invention can be operated as a closed system, recycling process water and reagent, which reduces process cost and is more environmentally desirable since there is minimal pollution and few, if any, waste products to be disposed of. Tar sands are separated into several clean products, each of commercial use. The process provides an upgraded, refined, low ash hydrocarbon liquid bitumen, clean sand, clay, and metal-hydrocarbon agglomerates useful as fuel and containing readily recoverable metals.

The bitumen product recovered from steam flooding has a specific gravity of about 8° API. In comparison, the hydrocarbon liquid recovered in the process of this invention has an API of about 14°.

The process of the invention separates bitumen from tar sands, utilizing a separation reagent formed by reacting tar sands with an inorganic base. The tar sands are suspended in aqueous solution containing the separation reagent in the absence of an organic solvent. When the solution is subjected to ultrasonic energy, the lighter, non-polar hydrocarbon fraction of the bitumen progressively separates from the sand particles and rises to the surface. The heavier asphaltene containing fractions of bitumen agglomerate to form particles containing a high concentration of heavy metals. All of the products of this process are readily recoverable in usable form.

The liquid hydrocarbon skimmed from the surface is low in ash content. The asphaltene and metal-containing agglomerates can be separated from the sand by screening. The sand is clean and can be used for industrial applications such as construction materials or production of glass. The agglomerates can be burned as fuel for power generation and the strategic metals such as titanium, germanium and nickel can be recovered from the ash as metal oxides. A most surprising discovery is that the aqueous solution containing the separation reagent is reusable to treat other batches of tar sand or other carbonaceous materials requiring separation and refining. The solution can be reused with high recovery of liquid hydrocarbon from the surface of the aqueous phase. Some bitumen is dissolved in the solution. This is supported by mass balance calculations on the bitumen. The process continuously forms additional separation reagent in situ. The separation reagent acts both as a surfactant to aid in release of bitumen from the surface of the sand particles and as a bitumen solvent. This is experimentally supported by the fact that the solution turns dark brown. The separation reagent is present in an amount of at least 20 percent by weight and increases up to about 75 percent by weight. In contrast, solutions of inorganic base containing tar sands subjected to mechanical agitation contain less than 2 percent by weight of the separation reagent.

The inorganic base reacts with chemical components of the bitumen. The bitumen is known to contain nitrogen, oxygen and sulfur bound into organic groups. These groups, in the form of short and long chain $C_{14}$–$C_{22}$) carboxylic acids, react with the inorganic base to form a soap with surfactant properties. Other reactions also occur since the separation reagent has solvent properties.

The process of the invention, utilizing a nontoxic and non-flammable, environmentally safe reagent, produces a clean-burning (low ash), lower viscosity alternative liquid fuel from tar sands.

The process, after an initial run to produce the separation reagent in situ, requires only small, makeup quantities of chemical since it operates essentially as a closed system. The reagent produced in the process can be used in other separation or refining processes. The process of the invention does not require heat. The process of the invention, by eliminating the costs of solvents, steam generation, high pressure, high temperature extraction units and toxic and environmental control equipment, offers significant economies. It is believed to be the first tar sands extraction units and toxic and environmental control equipment, offers significant economies. It is believed to be the first tar sands extraction process capable of producing liquid hydrocarbon products at a cost below the market price of these products.

These and other features and attendant advantages of the invention will become apparent as the invention becomes better understood by reference to the following detailed description and the accompanying drawings.

DETAILED DESCRIPTION OF THE INVENTION

The process of the invention is initiated with an ambient temperature solution in either a closed or open system. The process does not require application of heat energy as such. The process can be initiated at any ambient temperature above 0° C. Sonic generators provide effective cavitation at solution temperatures of approximately 45° C.–55° C. This temperature is achieved autogenously in the process of the invention by heat produced in situ in part by the energies released by ultrasonic waves and partly by exothermic reactions between alkaline sodium silicates and the inherently active acids and other reactive moieties present in the carbonaceous material. The product of this reaction is a water-miscible separation reagent.

The mined tar sand is crushed usually to particles from about 60 to 80 standard U.S. mesh size to provide a feedstock which can be introduced directly to the sonication unit or immersed in a pretreatment tank containing an aqueous solution of separation reagent. The ratio of tar sand to solution depends on the concentration of the reagent, the energy and frequency of sonication and the depth of the suspension. Usually the ratio of tar sand to liquid is from 10 to 35 percent by weight. The separation reagent is formed using sonication and can be recovered and/or recycled to the pretreatment tank. During the pretreatment soak, the separation reagent penetrates the bitumen/sand interface and contacts the surface of the sand particles. The required time for sonication is reduced if the tar sand has been subjected to pretreatment.

After tar sand has been pretreated with the separation reagent, it enters a sonication unit where ultrasonic energy is applied. During sonication the process known as cavitation takes place consisting of formation and collapse of countless vacuum bubbles in the liquid. For every wave cycle there are two complete formation implosion processes of bubbles. For example, 90,000 formation-implosion sequences occur per second in a sonic bath subjected to 45 kHz ultrasonic frequency waves. Theoretically, localized temperature of 20,000° F. and pressures of 10,000 psi are generated which produce extreme turbulence and an intense mixing action. Cavitation, induced by ultrasonic waves, provides additional reagent penetration of the bitumen/sand grain bond and results in the detachment of the bitumen from the sand grains. A light fraction of bitumen floats to the surface of the solution where it is skimmed off. Essentially, bitumen-free sand grains and charcoal-like solids remain in the bottom of the sonication tank. They are collected and sent to a washing unit.

Figure 1:
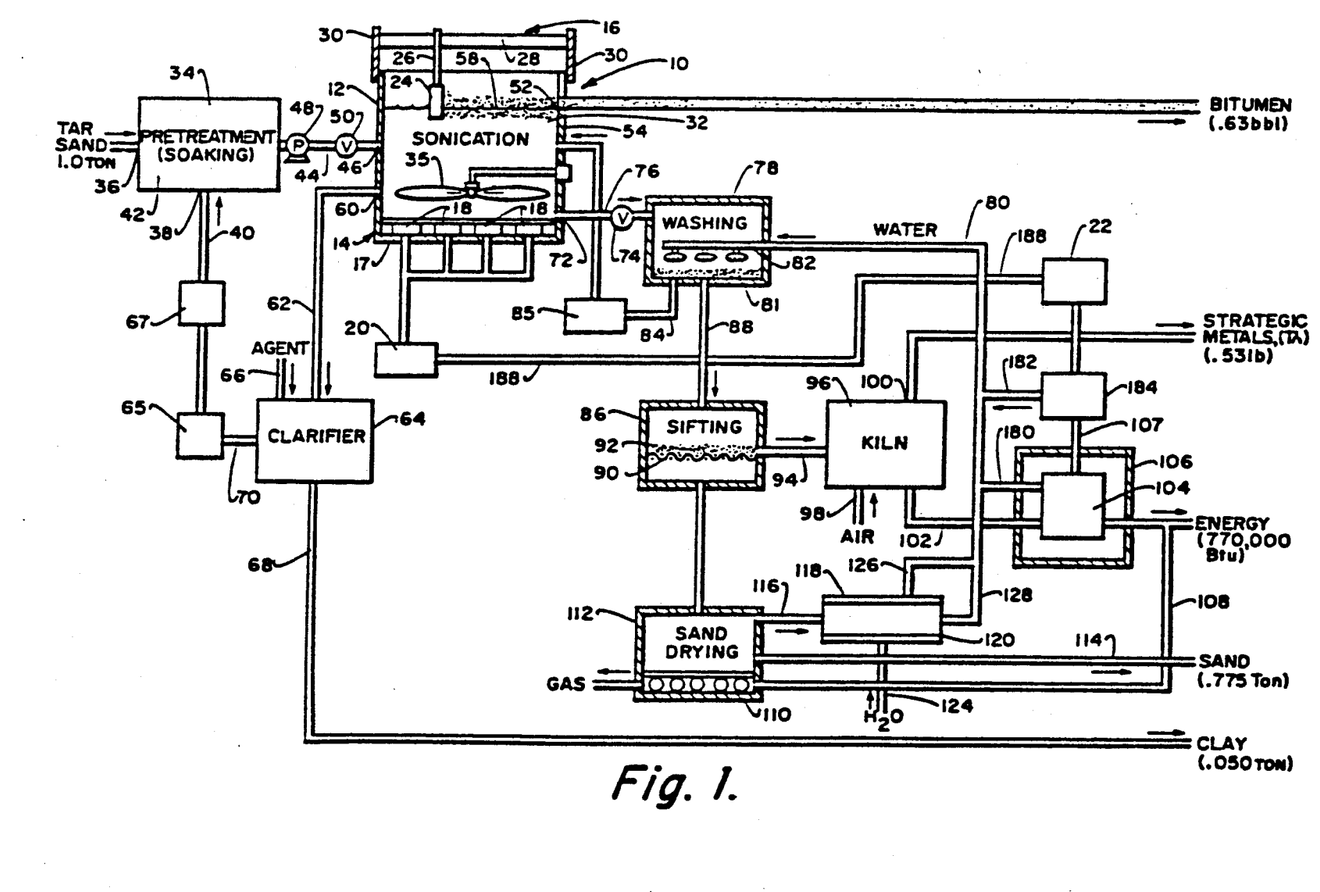
FIG. 1 is a schematic and diagrammatic view of the process of the invention for separating and recovering a hydrocarbon oil and other by-products from tar sands.

The separation step of the process applied to tar sands can be illustrated by the following equation:

Oil floats to the top of the suspension. Clean clay is removed from the aqueous reagent phase by clarification and/or filtration and the reagent is then recycled for reuse. The agglomerates are screened from the clean sand and can be combusted to provide heat and power for the process; strategic metals such as titanium, germanium and nickel can be recovered as metal oxides from the ash. All products of the process are saleable and contribute to the economics of the process by providing income and avoiding the need to treat or dispose of waste chemical materials. The process or elements of the process can also be utilized to upgrade and refine other carbonaceous materials such as oil shale, heavy petroleum distillates and various coal liquefaction products. The separation reagent can be pumped into various formations and utilized as in situ agent in the secondary or tertiary recovery of petroleum or the in situ recovery of bitumen from tar sands or oil shale. The separation reagent can also be utilized as a hydrocarbon degreaser. A schematic flow diagram of the process is illustrated in FIG. 1. Separation, upgrading and refining of bitumen takes place in the sonication unit 10. The unit 10 comprises a tank 12 having sonic generation means 14 disposed along the bottom wall 17 and skimming means 16 provided at the top of the tank 12. The sonic generator can take the form of a number of transducers 18 connected to a power supply-controller 20. The power supply 20 may receive at least a portion of its power from the generator 22 as may the skimming means 16. The skimming means 16 comprises a paddle 24 connected to an arm 26 which is translated across the top of the tank 12 by the conveyor or trolley 28. The trolley can be adjustable positioned in brackets 30 to vary the height of the paddle. The tank may optionally contain a low RPM mixer 35 to maintain movement of the suspension past the transducers 18.

The tank 12 receives a suspension 32 of tar sands in an aqueous medium containing the separation reagent either directly from storage, recycled from the process, or, as shown, from a pretreatment tank 34. The use of pretreatment step in which the reagent soaks into the bitumen is found to substantially reduce the time and energy expense of sonication in the unit 10 to remove the bitumen from the sand particles. The feedstock tar sand may be held in the pretreatment tank for varying periods of time, usually from 0.5 hours to 24 hours.

The pretreatment tank has a tar sand inlet 36 and an inlet 38 for receiving the recycled solution containing the separation reagent in line 40. The pretreated suspension 42 in tank 34 is delivered by line 44 containing a pump 48 and valve 50 to the inlet 46 of the sonicator unit 10. The pump 48 pumps the pretreated suspension 42 until the height of the suspension 32 in the tank 12 is at the top edge 52 of the side wall 54. The pump 48 is turned off and the valve 50 is closed. The controller 20 is turned on to drive the transducers 18 and sonicate the suspension 32. Rotation of mixing blade 35 is also initiated. When bitumen starts separating from the particles and fractionating into lighter and heavier fractions, a lighter liquid hydrocarbon oil rises to the top of the wall 54. The conveyor 28 is then actuated and reciprocates blade 24 to skim the hydrocarbon layer 58 over the edge 52 for recovery.

During sonication, minute vacuum bubbles form and implode. This action creates heat and mechanical energy at many locations throughout the suspension. The sonication action participates along with the surfactant activity of the separation reagent in removing bitumen from the surface of the particles. It also acts to first separate lighter, less viscous, non-asphaltene fractions from the bitumen and to agglomerate the remaining heavier (asphaltene and preasphaltene) fractions into agglomerates containing substantially all the heavy metal impurities. The local heat and intense local turbulence due to sonication causes the inorganic base to react with acid containing polar groups in the bitumen to form water miscible surfactant compounds which enter the water phase as the separation reagent. Sonication is responsible for the formation of micelles and vesicles which participate in the upgrading and refining of the separated bitumen.

Tar sands contain clays; e.g., Athabasca. Tar sands usually contain about 5 percent by weight of very fine clay particles. The bulk of these clays are separated in the sonication unit. The small particles of clay, impacted by the upward direction of ultrasonic wave motion, become suspended in the solution rather than settling to the bottom with the sand particles. The clay content in the solution would increase as the process continues unless clays are removed during the process. Therefore, supernatant solution is withdrawn from the sonication unit through an outlet 60 and flows through a line 62 to a clarifier tank 64 where the clays settle to the bottom. A flocculation agent or settling agent such as a polyelectrolyte salt or polymer can be added to the clarifier 64 through inlet 66. The clarified solution containing surfactant is then magazine filtered in filter 65 and further clarified in secondary clarifier 67 before being recycled through line 70 to the first stage pretreatment tank 34.

The mixture of bitumen-free sand grains and charcoal-like agglomerate materials in the bottom of the sonication unit discharges through an outlet 72 into a line 76 containing a valve 74 which carries the mixture to a washing unit 78 in which clean water from line 80 flows countercurrently through the mixture. The washing unit 78 is designed to recover for recycling the separation reagent still adhering to the sand grains and to the agglomerate particles and to clean the sand and agglomerates of remaining clays. The wash water containing the separation reagent is removed from the particles and recycled through a line 84 containing a magazine filter 85 to the sonication tank 12.

The washed suspension 81 is then delivered to a sifter 86 through a line 88. The smaller sand particles fall through the multi-layered reciprocating screen 90 while the agglomerates 92 are retained on the top of the screen 90. The agglomerates 92 are fed through a line 94 to a combustion unit 96 where they are combusted with air fed through a line 98 to form metal oxide containing ash recovered through an outlet 100 and a flue gas leaving the unit 96 through a flue line 102. The line 102 flows past the tube bank 104 in steam boiler 106 to form steam leaving the tube bank 104 through a line 107. The outlet flue gas in line 108 is then sent to the base 110 of the sand drier 112. The dry, clean sand is recovered in line 114 while the water vapors in outlet 116 are sent to a condenser 118.

The shell 120 of the condenser is fed cool water through inlet 124. The condensate line 126 and coolant water outlet line 128 join to form line 80. A branch line 180 feeds water to the tube bank 104 and line 182 returns condensate from the turbine 184 to line 80. The turbine drives electrical generator 22 which can deliver the electrical power developed to the power supply 20 by means of line 188.

From a material balance it is estimated that 0.63 barrel bitumen, 0.53 pound titanium, 0.77 million Btu energy, 0.775 ton clean sand, and 0.05 ton of clay could be produced out of one ton of raw tar sand material by the process of the invention.

The in situ formation of the separation agent was discovered during an investigation of the use of inorganic alkaline reagents in the processing of tar sands. Initial experiments were conducted using aqueous sodium silicate solutions containing about 5 percent by weight of silicate (20/1 water/silicate).

EXAMPLE 1

30 grams of tar sand was allowed to soak in 400 ml of a 5 percent aqueous sodium silicate solution. The solution containing tar sand particles was subjected to shear by rotation of a mixing element at a speed above 300 rpm for 5 minutes. Some bitumen separated from the sand particles but settled to the bottom of the flask after the solution was allowed to set. Only a very small amount of oil floated to the top. The solution was subjected once a day to a 5-minute, low shear mixing for one week. There was little change for the first four days. After the fifth and sixth days an appreciable amount of foam formed and a small amount of bitumen floated to the top with the foam and remained on top. The ash content of the bitumen was 3.8 percent. It was believed that a novel separation/reagent was being formed by reaction of the silicate and components of the bitumen as evidenced by the foam layer. The six day delay in forming the surfactant was attributed to a slow saponification reaction or a slow oxidation of the bitumen. Ultrasonic vibration was then tried in order to break the bitumen into smaller particles and thus increase surface area and reaction rate.

EXAMPLE 2

Fresh tar sand (167 grams) was added to 800 ml of 5 percent sodium silicate solution in a beaker, placed in the water bath of a sonicator. After sonication overnight at 55 kHz it was found that an appreciable amount of bitumen floated to the top of the suspension. The aqueous phase in the beaker had turned brownish turbid after 12 hours. The ash content of the recovered bitumen was lower (1.03 percent) than that which resulted from Example 1 and, thus, represents an upgrading of the recovered bitumen.

EXAMPLE 3

Example 2 was repeated substituting distilled water for the reagent solution. No bitumen was recovered. This demonstrates that ultrasonic vibration alone is not capable of separating bitumen, nor is it capable of upgrading and refining the separated bitumen.

Further experiments were conducted to determine the effect of mild agitation, up to 450 rpm, on bitumen separation and recovery.

EXAMPLE 4

In the first run, 170.3 g of tar sand, added to 800 ml of solution (20:1 by volume water to sodium silicate) in a 1000 ml beaker, was sonicated in conjunction with mechanical agitation (about 400 rpm) for 48 hours. The aqueous solution turned brown and a lighter, oil product rose to the top of the solution. The weight of product skimmed from the top of the solution was determined to be 16.9 g after the samples had been dried at 50° C. in a vacuum for 24 hours. The ash content of the product was found to be 0.16 percent. The pH value of the brownish phase was measured to be 11.7 which is lower than that of the sodium silicate solution used (pH=12.3). After the spent liquid phase was decanted, the sediment residue was briefly washed with distilled water. It was discovered that large chunks of black, charcoal-like solids appeared in the residue.

It was surprising to discover that the sonication of an alkali metal silicate solution, with or without agitation, results in both separation of bitumen from tar sand particles and fractionation of the bitumen into a lighter, upgrade oil which rises to the top and a heavier fraction which remains at the bottom. No organic solvent is used in the separation. The lighter oil containing less than 1.0 percent ash may be further used in refining. The charcoal-like black solids in the residue may be used for combustion to generate energy.

Another important finding is that charcoal-like solids remaining at the bottom are not hexane soluble. They are partially soluble in toluene and mostly soluble in pyridine. When a sample was shaken with pyridine, bubble foam appeared on the surface of the solution. Since pyridine is a base, it reacted with the carboxylic acids of the charcoal-like solids. This generated a soap which can be depicted by the following equation:

Pyridine   Carboxylic Acid   Soap
(base)     (acid)            (salt)

In order to determine the exact content of the organics and inorganics present in tar sand, and to investigate the nature of the reaction product between the alkaline base and components of bitumen and its mechanism in separating, upgrading and refining bitumen, tar sands were subjected to a series of Soxhlet extractions. The raw tar sand was first fractionated using hexane followed by toluene and then pyridine. The hexane ane followed by toluene and then pyridine. The hexane fractions). The hexane insolubles (soluble in toluene) are known as asphaltene. The final extraction, using pyridine, separated the remaining organics present (preasphaltene or carbene and carboid) known as toluene insolubles. Toluene and pyridine solubles (heavy fractions) are black solids with the most polarity characterization. The results are presented in Table 1.

TABLE 1

| Sample | % wt. of Tar Sand | % wt. of Organic |
|---|---|---|
| Tar Sand | 100.00 | — |
| (1) Organics | | |
| a Hexane Sol. (Oil and Resin) | 12.5 | 82.5 |
| b Toluene Sol. (Asphaltene) | 2.07 | 14.17 |
| c Pyridine Sol. (preasphaltene) | 0.49 | 3.33 |
| (2) Inorganics (non-organic minerals) | 82.92 | — |

The results given in Table 1 show that the highest cut of organic component of tar sand is hexane soluble. They are mainly composed of long chain saturated and unsaturated aliphatic hydrocarbon compounds. The pyridine-soluble (preasphaltene) materials were present in the lowest amount and the toluene soluble asphaltenes in an intermediate amount. These data indicate that the coke-like agglomerates are mainly composed of asphaltenes and preasphaltenes and that the process of the invention fractionates and separates the hexane-soluble hydrocarbons from the asphaltenes and preasphaltenes.

From FTIR spectra of bitumen samples it is observed that the polar pyridine soluble fraction shows the strongest absorption of the 1700 cm$^{-1}$ band, characteristic of carboxylic acids. The toluene soluble fraction shows the next strongest absorption of this band and the hexane solubles show the least absorption of the band.

Gas chromatographic analysis was performed on vials of 0.2 gram of toluene soluble bitumen fraction and the pyridine soluble fraction in 5 ml of 5 percent aqueous sodium silicate. After sonication for two days, the vials were removed from the sonicator and shaken. It was found that an appreciable amount of foam appeared in the vial containing the pyridine-soluble fraction. Less foam was observed with the toluene-soluble fraction. The aqueous phase in both vials was brownish as contrasted with the transparent, colorless silicate solution prior to reaction. The brownish aqueous phase containing base-extractable carboxylic acids was then transferred to a clean flask and was acidified with HCL. The purpose of this step was the return of the saponified carboxylic groups to their original state of carboxylic acids.

Dichloromethane, a water-insoluble organic solvent, was then added to extract the carboxylic acids from the aqueous phase. Separation of the dichloromethane phase from the aqueous phase was done using a separatory funnel. The dichloromethane in each sample was then vaporized in a fume hood. The concentrated sample was further reacted with methanol/BF$_3$ mixture; the latter component serves as a catalyst for the esterification reaction.

In this esterification reaction, the methyl group ($-CH_3$) from methanol replaces the hydrogen in the carboxylic group ($-COOH$) of the acids and an ester is formed which can be identified with ease. The resultant ester derivatives retain the structures of carbon chain in the original carboxylic acids. They are also volatile at elevated temperatures. Since the esters derived from carboxylic acids vary in molecular weight as well as chemical structure, their boiling points and retention time in a capillary column are different. In such a manner, the esters and also the original acids are identified.

The samples were placed in a fume hood to vaporize the solvent methanol which will damage the capillary column of gas chromatographer if not removed. The sample was then redissolved in dichloromethane and magnesium sulfate was added to remove residual moisture. The sample was filtered to remove solid particles prior to injection into the gas chromatographer.

The following major compounds in the pyridine soluble fraction were identified by the use of a Hewlett-Packard Model 5880A gas chromatographer.

(a) $C_{14}$, myristic acid, $CH_3(CH_2)_{12}COOH$
(b) $C_{16}$, palmitic acid, $CH_3(CH_2)_{14}COOH$
(c) $C_{18}$, oleic acid, $CH_3(CH_2)_7CH:CH(CH_2)_7COOH$
(d) $C_{20}$, arachidic acid, $CH_3(CH_2)_4(CH\ CHCH_2)_4(CH_2)_2COOH$
(e) $C_{22}$, decoranoic acid, $C_{21}H_{43}COOH$ The same carboxylic acids were also found in the toluene-soluble fraction but to a lesser extent. The data indicate that one of the major active agents in the water-soluble separation reagent is the saponification reaction product of the alkaline base; e.g., sodium silicate and the $C_{14}$ to $C_{22}$ long-chain carboxylic acids.

The process of the invention is unique in providing substantial recovery of a light oil, low in ash content, on the surface. The contributions of ultrasonic energy, alkali metal base, aqueous media in absence of organic solvent and chemical nature of the constituents of bitumen are all necessary for the process to operate. These factors combine in a synergistic manner in the bitumen recovery and refining mechanism of the invention.

Figure 2:
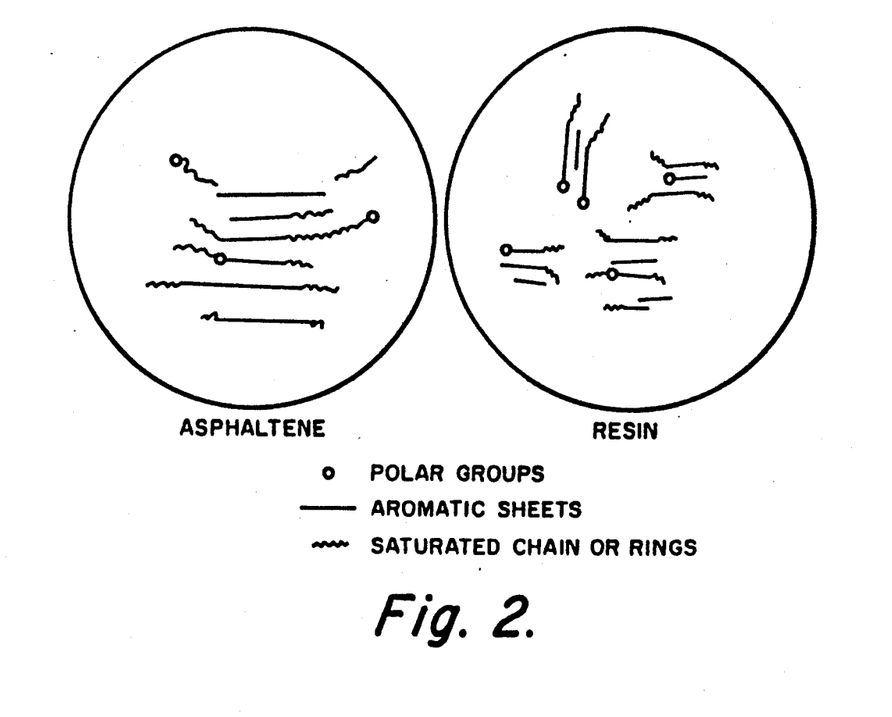
FIG. 2 is a schematic view of the structure of asphaltene and resin components of bitumen.

Carbonaceous materials contain an oil or bitumen rich in polar resin and asphaltene molecules with a heteroatom content of 1 to 2 percent of the total carbon as shown in FIG. 2. Bitumen also contains some polar preasphaltenes and non-polar hydrocarbon materials. The molecular weight of these components increases from the hydrocarbon fraction, resin, asphaltene, to the preasphaltenes. The asphaltene and resin contents are lower in light crude oils or geologically old crudes and are higher in residual crudes recovered after primary or successive recoveries from a field and in heavy oils such as tar sand bitumen.

An important feature of the asphaltene and resin molecules is that they both contain polar functional groups, e.g., the S, N and O groups. For this reason they adsorb strongly onto the rock surface, e.g., the sand grain. The adsorption or adhesion of resin and asphaltene to the surfaces of the sand grain is one factor contributing to the difficulty of bitumen separation.

Figure 3:
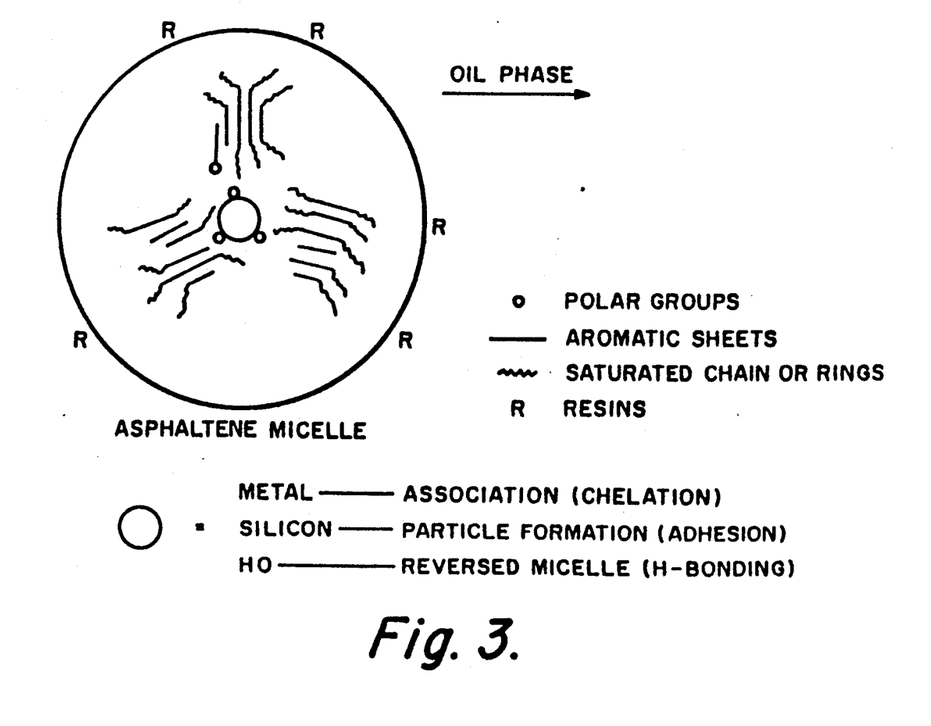
FIG. 3 is a schematic view of asphaltene micelles in a crude oil.

Both asphaltenes and resins consist of aromatic sheets with saturated and polar functional groups interspaced closely to long chains (FIG. 2). Asphaltenes in their natural state exist in micelle form (FIG. 3), peptized with resin molecules. The center of this micelle can be either metal (V, Ni, Fe, etc.) or silica (or clay), or trace water. The essential feature is that the polar groups are concentrated towards the center. This often is termed oil external-water internal or reversed micelle. Surface adhesion is mainly due to hydrogen bonding, although other intermediate bonding mechanisms do exist such as charge transfer and acid-base salt formation.

In the present invention bitumen removal from the sand grains and separation into a lighter non-polar low ash content fraction and a heavier polar fraction occurs due to in situ generation of surfactants and reversal of the micelle to a polar external induced by the actions of the ultrasonic energy in the presence of the inorganic base. A surfactant forms and migrates into the reverse micelle. The ultrasonic cavitation causes spontaneous emulsification of the asphaltene and resin molecules and the three phase reverse micelle becomes a continuous single phase with reversal of the micelles to the polar external form.

The interaction of sodium silicate or other alkaline base with the resin molecules acts in a membrane mimetic fashion. That is, the cation will associate with the resin heterocyclic center and the anion will be activated to allow the base to dissolve in the oil phase. In this manner the resin molecule will be dissociated and any ionizable proton such as COOH, SH or NH will be replaced with sodium. The reaction product of sodium with the polar groups on the resin molecules is the active surfactant of the separation agent.

Figure 4:
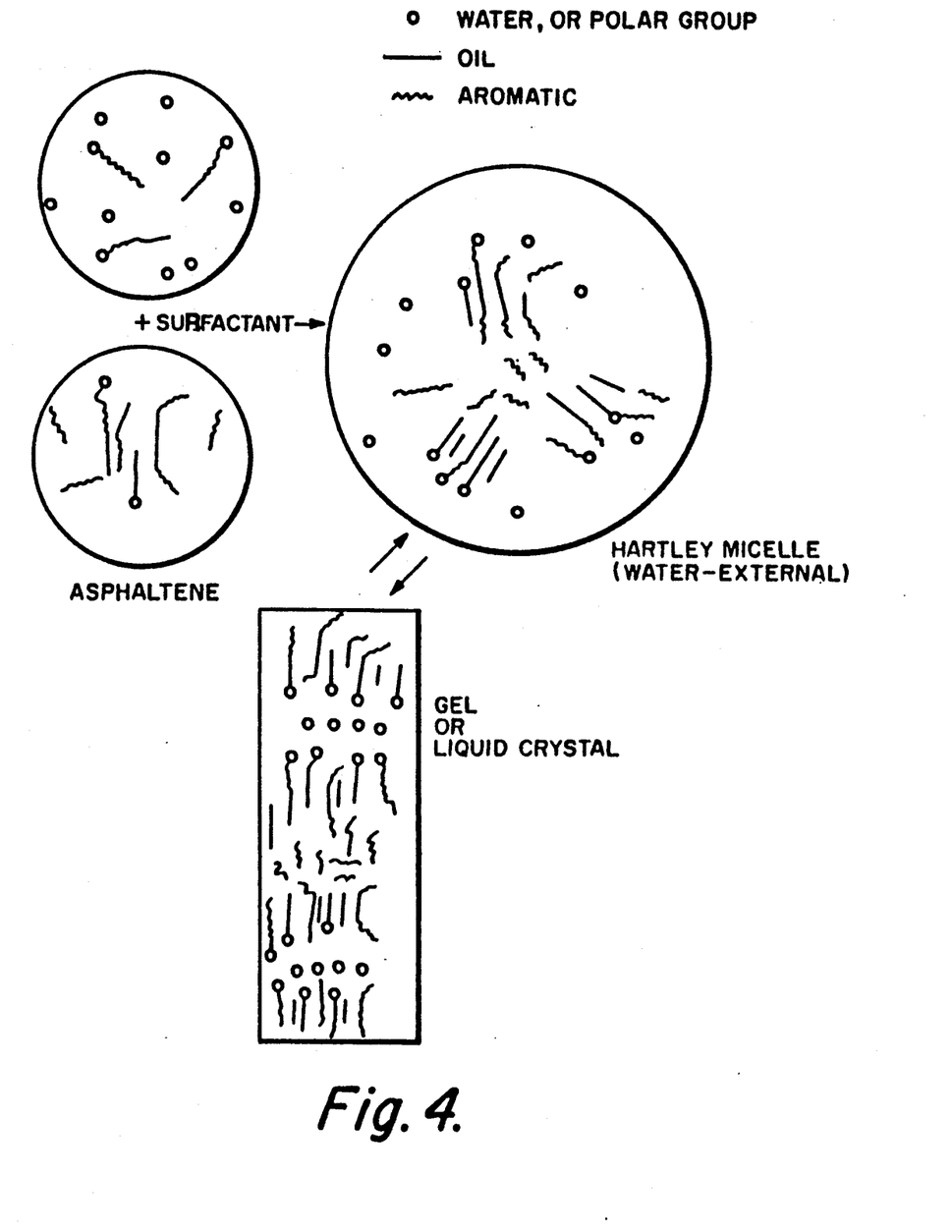
FIG. 4 is a schematic view of the conversion of a micelle into a bilamellar vesicle.

When this surfactant migrates into the micelle it disrupts the polar structure to form a Hartley micelle or polar-external micelle as shown in FIG. 4. A gel or liquid crystal phase may also form. The silicate emulsifies the oil and the micellar structure becomes a microemulsion stabilized by the surfactant molecules. Sonication results in removal of the heteroatoms by decreased hydrogen bonding, charge transfer and salt formation. The effect is to lower oil viscosity and gravity, and to increase and facilitate recovery of the bitumen. The separation reagent is mainly in the form of a microemulsion of the polar micelles dispersed in the aqueous phase. The silicate anions are associated with the micelles. The organic bitumen components are carried into the aqueous phase by the action of the anion associating with the polar components of the bitumen. The bitumen is temporarily stabilized within the aqueous phase by means of the micelles. Separation results as the lighter hydrocarbon oils rise to the top of the aqueous phase and the heavier preasphaltenes and asphaltenes complexed with metals precipitate and agglomerate to form charcoal-like material. The brown aqueous phase is stable and the microemulsion of micelles remains and can repeatedly be utilized as the separation reagent.

Figure 5:
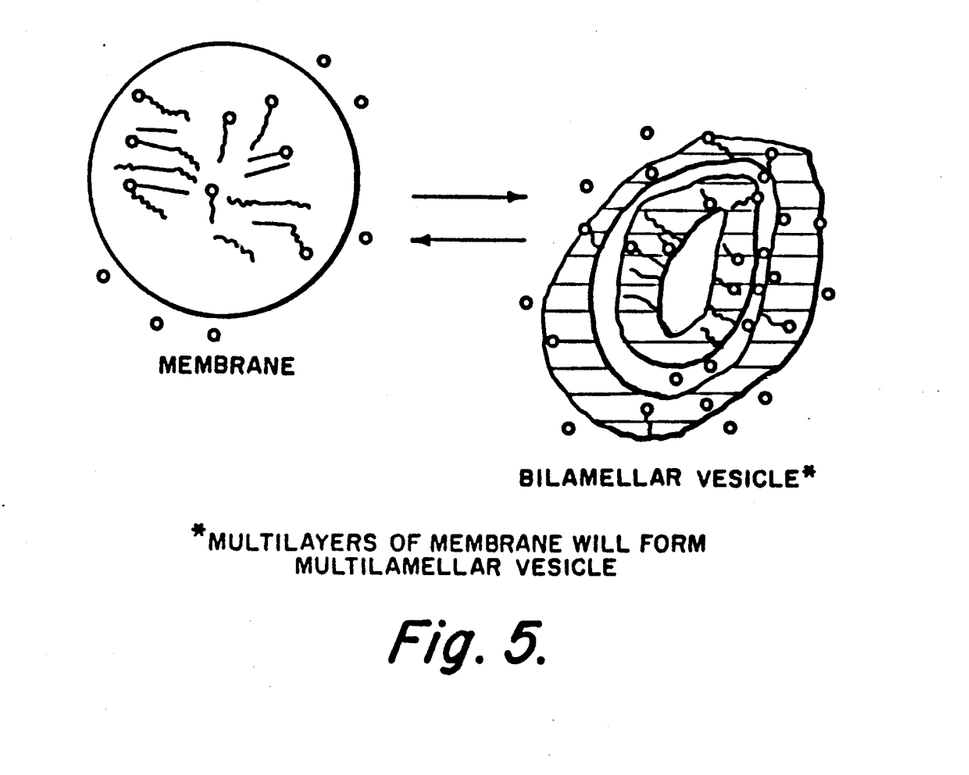
FIG. 5 is a schematic view of interconversion between membrane and bilamellar vesicle.

The stability of the microemulsion may also be due to the presence of transition metals such as titanium. The metal can form a rigid membrane film by associating with the polar groups on the surface of the micelle to form a layer which further associates with surfactant molecules to form multiple layered membrane vesicles as shown in FIG. 5. The closed membrane system provides increased stability. The membrane-mimetic properties are useful in the spontaneous emulsification of bitumen and may be responsible for its effective removal from sand particles. The concentration of sodium cation from the separation reagent-surfactant-micelle is such that resin molecules in the micelle develop cavities containing several complexing moieties capable of acting as a host for complexing the transition metal cation from the bitumen. The host-guest complexes are highly water soluble and attract oil as a true surfactant and carry it from the bitumen into the water phase. These complexes are stable for long periods of time providing long shelf-life for the separation reagent.

The following experiment was conducted to determine the effect of adding small amounts, from $10^{-5}$ to 1M, of alkali metal phosphates to the aqueous silicate solution.

EXAMPLE 5

In this run, $10^{-3}$M of sodium phosphate ($Na_3PO_4$) was added to the treatment solution of Example 4 and the same operating conditions were followed. It was found that 19.0 g of oil was recovered as a supernatant layer showing that phosphate did enhance the recovery. The ash content of the oil recovered was determined to be 0.12 percent. A very small amount of this additive did improve the recovery of oil both qualitatively and quantitatively.

EXAMPLE 6

In this example it was attempted to reuse the spent brownish solution obtained in Example 4 to determine whether the spent brownish solution still contained the separation reagent generated during sonication in Example 4. Reusing the brownish phase to separate bitumen from fresh tar sand may either shorten the time of separation or increase the amount of recovery. It was found that 9.1 g of light oil was recovered from 170 g of tar sand after sonication plus mild agitation for one day. An additional amount of 12.0 g of oil was recovered in the second day. The ash contents of the samples were found to be 0.34 percent and 0.40 percent by weight, respectively. The total recovery (21.1 g) was improved as compared with the Example 4 (16.9 g); the quality of the oil was also higher (less ash). The brownish phase obtained from Example 4 contained an active separation reagent which contributed to the higher recovery of oil. The results of Examples 4, 5 and 6 are summarized in Table 2.

TABLE 2

|  | Run 5 | Run 6 | Run 7 |
| --- | --- | --- | --- |
| Weight of Tar Sand | 170.3 | 170 | 170 |
| Volume of Sodium Silicate (20:1) Solution (ml) | 800.0 | 800 | 800 |
| Weight of Oil Recovered (g) | 16.9 | 19 | 21.1 |
| Ash Content in Recovered Oil (%) | 0.67 | 0.12 | 0.40 |
| Weight of Sediment (Sand + Charcoal-like Solid) (g) | 146.3 | — | — |
| Amount of Material Entering Solution Phase (1-3-5) (g) | 7.1 | — | — |
| pH of Spent Solution After Extraction | 11.7 | 11.76 | 11.6 |
| pH of Fresh Sodium Silicate Solution | 12.3 | 12.3 | — |

Run 5: Ultrasonic vibration with mild mechanical agitation.
Run 6: Ultrasonic vibration with mild mechanical agitation and phosphate added.
Run 7: Ultrasonic vibration with mild mechanical agitation and spent sodium silicate solution reused.

The brownish liquid was an effective separation reagent and can be used more than once. This liquid also shortened time of separation significantly.

From the results in Table 1 showing that the total available organics present in tar sand are 14.61 percent by weight, one can further convert the recovery of oil in Table 2 into recovery efficiency based on the available organics in tar sand. The results are summarized in Table 3.

TABLE 3

|  | Run 1 | Run 2 | Run 3 |
| --- | --- | --- | --- |
| Tar Sand (g) | 170.3 | 170.0 | 170.0 |
| Available Organics (g) | 24.88 | 24.84 | 24.84 |
| Oil Recovered (g) | 16.9 | 19 | 21.1 |
| Weight of Recovered Oil (%) | 68.0 | 76.5 | 84.9 |
| Ash content in the Recovered Oil (%) | 0.78 | 0.12 | 0.40 |

Other inorganic bases were tested for their effectiveness in forming a separation reagent with bitumen. Five percent by weight sodium phosphate ($Na_3PO_4.12\ H_2O$), sodium hydroxide (NaOH) and sodium carbonate aqueous solutions were compared to the 20/1 water to silicate solution. The results for carbonate and phosphate reagents sonicated for six hours are presented in the following tables:

TABLE 4

| | | Oil Recovery Using Sodium Phosphate Solution | | | |
| --- | --- | --- | --- | --- | --- |
| Time (hrs) | Oil (g) | Recovery (%) | Cum. Recov. (%) | pH | Temp. (Celsius) |
| 0.00 | 0.0000 | 0.00 | 0.00 | 11.95 | 27.00 |
| 1.00 | 0.7600 | 2.55 | 2.55 | 11.95 | 40.00 |
| 2.00 | 2.9528 | 9.91 | 12.46 | 11.95 | 44.00 |
| 3.00 | 8.5838 | 28.80 | 41.26 | 11.95 | 47.00 |
| 4.00 | 4.9580 | 16.64 | 57.90 | 11.95 | 47.00 |
| 5.00 | 2.2680 | 7.61 | 65.51 | 11.95 | 50.00 |

TABLE 5

| | | Oil Recovery Using Sodium Carbonate Solution | | | |
| --- | --- | --- | --- | --- | --- |
| Time (hrs) | Oil (g) | Recovery (%) | Cum. Recov. (%) | pH | Temp. (Celsius) |
| 0.00 | 0.0000 | 0.00 | 0.00 | 11.25 | 34.00 |
| 2.00 | 0.1683 | 0.56 | 0.56 | — | 45.00 |
| 3.00 | 7.9087 | 26.54 | 27.10 | 11.25 | 47.00 |
| 4.00 | 16.3352 | 54.82 | 81.92 | — | 52.00 |
| 5.00 | 13.2114 | 44.33 | 126.25 | — | 48.00 |
| 6.00 | 3.3942 | 11.39 | 137.64 | — | 49.00 |

When 5 percent by weight sodium phosphate solution was used, the culmative amount of oil recovered after five hours of sonication was 65 percent. This is a much lower amount of recovery than the 88 percent amount when using fresh 20 to 1 sodium silicate solution. Although sodium phosphate did not perform as well as sodium silicate solution in this case, it can still serve as a separation agent for the process.

After dissolving 5 percent by weight of sodium hydroxide pellets into water solution, the pH of the solution reached 12.6 which is little higher than the 12.3 for 20 to 1 fresh sodium silicate solution. Only 7.5 percent of oil was recovered after five hours of sonication of fresh tar sand in this solution. This result indicates that alkaline pH alone is not capable of separating significant amounts of bitumen from tar sands. The in situ separation reagent formed during the process of the invention appears to be responsible for separation, refining and upgrading of bitumen.

Interesting results have been observed in using sodium carbonate as a chemical agent for bitumen recovery. The history of oil recovery presented in Table 5 shows that 82 percent of the oil is recovered in the first four hours and another 44 percent recovered during the fifth hour (the cumulative percent recovery is higher than 100 percent due to sodium carbonate present in the oil layer). These results indicate that sodium carbonate forms an effective separation reagent.

One of the major differences between spent sodium carbonate solution and spent sodium silicate solution is that the color of the former is clear yellowish and the color of the latter turns darkish brown during the process. This can be explained on the basis that spent sodium silicate solution forms a microemulsion acting as a surfactant which makes the spent solution miscible with organic components of the bitumen and in effect acts as a bitumen solvent.

Experiments have been conducted to compare the performance of the aqueous spent phases based on sodium silicate and sodium carbonate solutions. When the spent sodium silicate solution was reused a second and third time, it was again found that the bitumen dissolved into the solution within two hours for both cases. About 50 to 60 percent of bitumen settled overnight on the bottom of the storage beakers. When the tar sands were sonicated for six hours with spent sodium carbonate solution used a second time; 65 percent oil was recovered; 41 percent oil was recovered when the spent carbonate solution was reused a third time. The history of bitumen recovery in fresh, first, second, third time reused sodium carbonate solution, showed that the rate of bitumen recovery decreases sharply. This suggests that sodium carbonate is consumed as the reaction proceeds and that sodium silicate forms a more effective separation reagent.

Commercially there are several different types of sodium silicate (different $SiO_2/Na_2O$ ratios and solids contents) available for different industrial applications. A study on finding the optimum $SiO_2/Na_2O$ ratio was conducted.

Initially four types of sodium silicate (N, ACORE-16, RU and BJ-120 from PQ Corporation, Huntington Beach, Calif.) were used in sonication experiments. The specifications of these inorganic reagents are listed as follows:

| Product Name | % Wt. Ratio ($SiO_2/Na_2O$) | % $Na_2O$ | % $SiO_2$ | Solids |
|---|---|---|---|---|
| N | 3.22 | 8.90 | 28.7 | 37.60 |
| ACOR-E16 | 1.60 | 16.35 | 26.2 | 42.55 |
| RU | 2.40 | 13.85 | 33.2 | 47.05 |
| BJ-120 | 1.80 | 13.15 | 23.7 | 36.85 |

For all four experiments, an equivalent ratio of 20 to 1 by volume water to sodium silicate solutions was used to recover the bitumen from tar sand. The results are listed in Tables 6, 7, 8 and 9.

TABLE 6

Oil Recovery Using Sodium Silicate Grade ACOR-E16

| Time (hrs) | Oil (g) | Recovery (%) | Cum. Recov. (%) | pH | Temp. (Celsius) |
|---|---|---|---|---|---|
| 0.00 | 0.0000 | 0.00 | 0.00 | — | 50.00 |
| 1.50 | 2.8242 | 9.48 | 9.48 | — | 49.00 |
| 2.00 | 1.9736 | 6.62 | 16.10 | — | 45.00 |
| 2.50 | 2.6000 | 8.72 | 24.82 | — | 43.00 |
| 3.00 | 3.7500 | 12.58 | 37.40 | — | 43.00 |
| 4.00 | 9.6780 | 32.48 | 69.88 | — | 45.00 |
| 4.50 | 1.7730 | 5.95 | 75.83 | — | 45.00 |
| 5.00 | 1.6775 | 5.63 | 81.46 | — | 46.00 |

TABLE 7

Oil Recovery Using Sodium Silicate Grade N

| Time (hrs) | Oil (g) | Recovery (%) | Cum. Recov. (%) | pH | Temp. (Celsius) |
|---|---|---|---|---|---|
| 0.00 | 0.0000 | 0.00 | 0.00 | — | 44.00 |
| 1.50 | 1.5754 | 5.29 | 5.29 | 11.25 | 44.00 |
| 2.00 | 2.5700 | 8.62 | 13.91 | — | 43.00 |
| 2.50 | 2.4210 | 8.87 | 22.78 | 11.15 | 42.00 |
| 3.00 | 2.9495 | 9.90 | 32.68 | — | 41.00 |
| 3.50 | 2.6000 | 8.72 | 41.40 | — | 40.00 |
| 4.00 | 3.4575 | 11.60 | 53.00 | — | 43.00 |
| 4.50 | 3.0827 | 10.34 | 63.34 | — | 44.00 |
| 5.00 | 2.4492 | 8.22 | 71.56 | — | 45.00 |

TABLE 8

Oil Recovery Using Sodium Silicate Grade RU

| Time (hrs) | Oil (g) | Recovery (%) | Cum. Recov. (%) | pH | Temp. (Celsius) |
|---|---|---|---|---|---|
| 0.00 | 0.0000 | 0.00 | 0.00 | 11.65 | 50.00 |
| 0.50 | 0.3817 | 1.28 | 1.28 | 11.65 | 44.00 |
| 1.00 | 2.6370 | 8.85 | 10.13 | — | 41.00 |
| 1.50 | 3.1160 | 10.46 | 20.59 | — | 43.00 |
| 2.00 | 4.5030 | 15.11 | 35.70 | 11.75 | 44.00 |
| 2.50 | 3.9100 | 13.12 | 48.82 | — | 47.00 |
| 3.25 | 7.6000 | 25.50 | 74.32 | — | 50.00 |
| 4.58 | 6.5700 | 22.05 | 96.37 | — | 53.00 |

TABLE 9

Oil Recovery Using Sodium Silicate Grade BJ-120

| Time (hrs) | Oil (g) | Recovery (%) | Cum. Recov. (%) | pH | Temp. (Celsius) |
|---|---|---|---|---|---|
| 0.00 | 0.0000 | 0.00 | 0.00 | 12.05 | 50.00 |
| 0.50 | 0.4473 | 1.50 | 1.50 | — | 47.00 |
| 1.00 | 8.2402 | 27.65 | 29.15 | — | 40.00 |
| 1.50 | 0.4600 | 1.54 | 30.69 | — | 40.00 |
| 2.00 | 1.0660 | 3.58 | 34.27 | — | 44.00 |
| 2.50 | 2.4770 | 8.31 | 42.58 | — | 45.00 |
| 3.50 | 7.8600 | 26.38 | 68.96 | — | 47.00 |
| 4.50 | 5.9070 | 19.82 | 88.78 | 12.00 | 49.00 |
| 5.00 | 1.7062 | 5.73 | 94.51 | — | 50.00 |

From the results it was found that RU grade was most effective, followed in order of decreasing recovery efficiency for grades BJ-120, ACOR-E16 and N. These show that $SiO_2/Na_2O$ ratio of from about 1.8 to about 3.0, preferably from 2.0 to 2.7, provide the highest recovery efficiencies.

The cavitation process created by ultrasonic waves in the liquid solution speeds the oil recovery in the process of the invention. It is believed that different operation frequencies of transducers will yield different characteristic functions. The high frequency generates relatively large numbers of small bubbles that possess less intensity but higher penetrating capability. On the other hand, the low frequency generates relatively small numbers of large bubbles that possess strong implosion force and effective scrubbing action. Two transducerized tanks with operating frequencies of 25 kHz and 40 kHz were available. Several experiments have been conducted to investigate the rate and efficiency of the recovery process using these units. The first set of the experiments was designed to compare the sonication power by using only sonication without applying agitation.

TABLE 10

Oil Recovery Using 25 kHz Frequency Without Agitation

| Time (hrs) | Oil (g) | Recovery (%) | Cum. Recov. (%) | pH | Temp. (Celsius) |
|---|---|---|---|---|---|
| 0.00 | 0.0000 | 0.00 | 0.00 | 12.10 | 25.00 |
| 1.00 | 4.4283 | 29.72 | 29.72 | 12.10 | 40.00 |
| 2.00 | 4.4959 | 29.95 | 59.67 | 12.10 | 49.00 |

It was found that 25 kHz transducerized tank works much better than 40 kHz tank. With fresh 20 to 1 sodium silicate solution used in the 25 kHz tank, 30 percent of oil is recovered during the first hour, the next hour another 30 percent is collected from the top and no significant recovery could be obtained following the second hour of sonication (Table 10). The rest of the oil is either dissolved in the solution or has formed charcoal-like materials that are recovered with the clean sands. The color of the solution is light brown and the tar sand grains still coated with bitumen showed poor separation of attached bitumen from tar sand grains in the 40 kHz tank. This suggests that 25 kHz provides more effective supersonic waves for bitumen recovery, if no agitation is used.

The recovery efficiency obtained from the 40 kHz tank without agitation is less than those from applying 55 kHz frequency with agitation. This indicates that sonication of the solution with agitation may increase the recovery of bitumen. Therefore, another set of experiments was carried out to compare the recovery efficiency in two different frequencies with agitation. Results follow:

TABLE 11

Oil Recovery Using 40 kHz Operation Frequency With Agitation

| Time (hrs) | Oil (g) | Recovery (%) | Cum. Recov. (%) | pH | Temp. (Celsius) |
|---|---|---|---|---|---|
| 0.00 | 0.0000 | 0.00 | 0.00 | 12.10 | 27.00 |
| 0.50 | 1.8277 | 12.26 | 12.26 | 12.10 | 37.00 |
| 1.00 | 1.1097 | 7.44 | 19.70 | 12.10 | 43.00 |
| 1.50 | 3.9718 | 26.66 | 46.36 | — | 49.00 |
| 2.00 | 2.6849 | 18.02 | 64.38 | — | 50.00 |

TABLE 12

Oil Recovery Using 25 kHz Frequency With Agitation

| Time (hrs) | Oil (g) | Recovery (%) | Cum. Recov. (%) | pH | Temp. (Celsius) |
|---|---|---|---|---|---|
| 0.00 | 0.0000 | 0.00 | 0.00 | 12.10 | 27.00 |
| 0.50 | 1.1832 | 7.94 | 7.94 | 12.10 | 39.00 |
| 1.00 | 0.5124 | 3.44 | 11.38 | 12.10 | 42.00 |
| 1.50 | 3.2417 | 21.76 | 33.14 | — | 49.00 |
| 2.00 | 4.0107 | 26.92 | 60.06 | — | 53.00 |

In this experiment, the recovery efficiency in the 40 kHz transducerized tank (Table 11) is at least as good as that in the 25 kHz tank (Table 12). Sixty percent of the bitumen oil was recovered within two hours in both tanks. It is interesting to note that there was no significant difference for the rate of bitumen oil recovery in the tank sonicated at 25 kHz whether agitation is applied or not. In other words, agitation apparently can only aid the recovery in particular ranges of sonication frequency.

The solution used for the above two sets of experiments is fresh sodium silicate solution. Tenfold dilution of the ninth time reused spent sodium silicate solution from above runs was used in the following experiments.

TABLE 13

Oil Recovery Using 40 kHz Frequency

| Time (hrs) | Oil (g) | Recovery (%) | Cum. Recov. (%) | pH | Temp. (Celsius) |
|---|---|---|---|---|---|
| 0.00 | 0.0000 | 0.00 | 0.00 | 10.20 | 24.00 |
| 0.50 | 0.0000 | 0.00 | 0.00 | 10.20 | 52.00 |
| 1.00 | 0.9277 | 6.22 | 6.22 | — | 57.00 |
| 1.50 | 1.1078 | 7.44 | 13.66 | — | 60.00 |
| 2.00 | 7.5639 | 50.76 | 64.42 | — | 65.00 |
| 2.50 | 2.7336 | 18.34 | 82.76 | — | 69.00 |

TABLE 14

Oil Recovery Using 25 kHz Operation Frequency

| Time (hrs) | Oil (g) | Recovery (%) | Cum. Recov. (%) | pH | Temp. (Celsius) |
|---|---|---|---|---|---|
| 0.00 | 0.0000 | 0.00 | 0.00 | 10.20 | 24.00 |
| 0.50 | 1.2640 | 8.48 | 8.48 | 10.20 | 50.00 |
| 1.00 | 0.9175 | 6.16 | 14.64 | — | 54.00 |
| 1.50 | 2.0873 | 14.00 | 28.64 | — | 56.00 |
| 2.00 | 1.8345 | 12.34 | 40.98 | — | 62.00 |
| 2.50 | 2.2952 | 15.40 | 56.38 | — | 63.00 |

In the 40 kHz tank the rate of bitumen oil recovery with the in situ produced separation reagent (Table 13) is similar to that of fresh sodium silicate solution. The recovery rate seams to be a little slower in the 25 kHz range using the in situ prepared separation reagent.

Experiments were further conducted to determine exhaustion point of spent sodium silicate solution and the optimum concentration of the spent separation reagent by reusing one batch of sodium silicate solution repeatedly for nine times without adding any sodium silicate. Bitumen still could be recovered from the process.

It was postulated that the concentration of the active separation reagent may increase as the spent solution is reused. This was tested in an experiment in which a spent solution was prepared, diluted to about 30 percent of the concentration of the solution reused nine times. After five hours sonication only about 1 percent of bitumen is recovered during the first hour and thereafter no bitumen rose to the top of the solution. When the solution was decanted, clean sand and charcoal-like solids were found on the bottom of the sonication unit. The color of the spent solution was dark brown. This indicated that most of the bitumen had dissolved in the spent solution. This indicates that silicate solution reused nine times is an effective solvent for bitumen and can be then utilized in a process for liquefying bitumen. The product can be easily handled and transported by tanker or pipeline since it has a low viscosity. The high effectiveness of the nine times reagent also indicates its utility in the liquefaction of shale oil, coal and petroleum refining residues and other heavy carbonaceous materials.

It is observed that most of the bitumen oil recovery occurred during the first two hours of sonication. Again, charcoal-like solids are found on the bottom of the container along with clean sand particles. Substantially all the bitumen is recovered in less than two hours.

A material balance calculation indicated that about 15 to 20 percent of bitumen goes into the solution. The effect of a further dilution (10-1) was investigated. Results follow:

TABLE 15

Bitumen Oil Recovery
Using 9x Spent Solution
(300 Times Dilution)

| Time (hrs) | Bitumen Oil (g) | Recovery (%) | Cum. Recov. (%) | pH | Temp. (Celsius) |
|---|---|---|---|---|---|
| 0.00 | 0.0000 | 0.00 | 0.00 | 9.50 | 24.00 |
| 1.00 | 0.9793 | 3.29 | 3.29 | 9.10 | 48.00 |
| 2.00 | 5.4638 | 18.33 | 21.62 | 8.70 | 68.00 |
| 3.00 | 25.8004 | 86.58 | 108.20 | 8.60 | 69.50 |
| 4.00 | 3.2914 | 11.04 | 119.24 | 8.65 | 68.00 |
| 5.00 | — | — | — | — | 68.00 |

The data indicates that the rate of recovery of bitumen oil substantially decreased in the first two hours. Most of the bitumen oil recovery occurred in the third hour. However, this solution which is a 300-1 dilution of the ninth time spent solution is still more efficient in the recovery of bitumen oil than any of the previously tested fresh sodium silicate solutions. This indicates that the bitumen-sodium silicate reaction product and the concentration thereof is the effective reagent and not sodium silicate.

The effect of pretreatment of the tar sands with fresh sodium silicate (20/1) and 30-1 dilution of the ninth time reused spent separation reagent was investigated to determine whether the time of sonication and cost of energy could be reduced. It was believed that soaking the tar sands would permit the reagent to soak into the bitumen layer and coat the surfaces of the sand particles with surfactant. This process may minimize the time of the sonication and sonication energy used. The tar sands was permitted to soak for eleven hours before application of sonic energy. Results of the runs with the 30-1 dilution and fresh silicate solutions follow:

TABLE 16

Bitumen Oil Recovery
with Pretreatment by 9x Spent Solution
(30 Times Dilution)

| Time (hrs) | Bitumen Oil (g) | Recovery (%) | Cum. Recov. (%) | pH | Temp. (Celsius) |
|---|---|---|---|---|---|
| 0.00 | 0.0000 | 0.00 | 0.00 | — | 24.00 |
| 1.00 | 5.8231 | 19.54 | 19.54 | — | 45.00 |
| 2.00 | 17.7364 | 59.52 | 79.06 | — | 59.00 |
| 3.00 | 6.3439 | 21.29 | 100.35 | — | 63.00 |

TABLE 17

Bitumen Oil Recovery
with Pretreatment Using Fresh
Sodium Silicate Solution

| Time (hrs) | Bitumen Oil (g) | Recovery (%) | Cum. Recov. (%) | pH | Temp. (Celsius) |
|---|---|---|---|---|---|
| 0.00 | 0.0000 | 0.00 | 0.00 | — | 24.00 |
| 0.50 | 0.0000 | 0.00 | 0.00 | — | 40.00 |
| 1.00 | 4.8370 | 16.23 | 16.23 | — | — |
| 1.60 | 10.7455 | 36.06 | 52.29 | — | 35.00 |

In the experiment with pretreatment with fresh sodium silicate, 52 percent of bitumen oil was recovered during the first 1.6 hours (Table 18). Forty-six percent of bitumen oil was recoverable in the first 1.5 hours without pretreatment. Thus, pretreatment with fresh sodium silicate does not appear to provide any significant effect.

Figure 6:
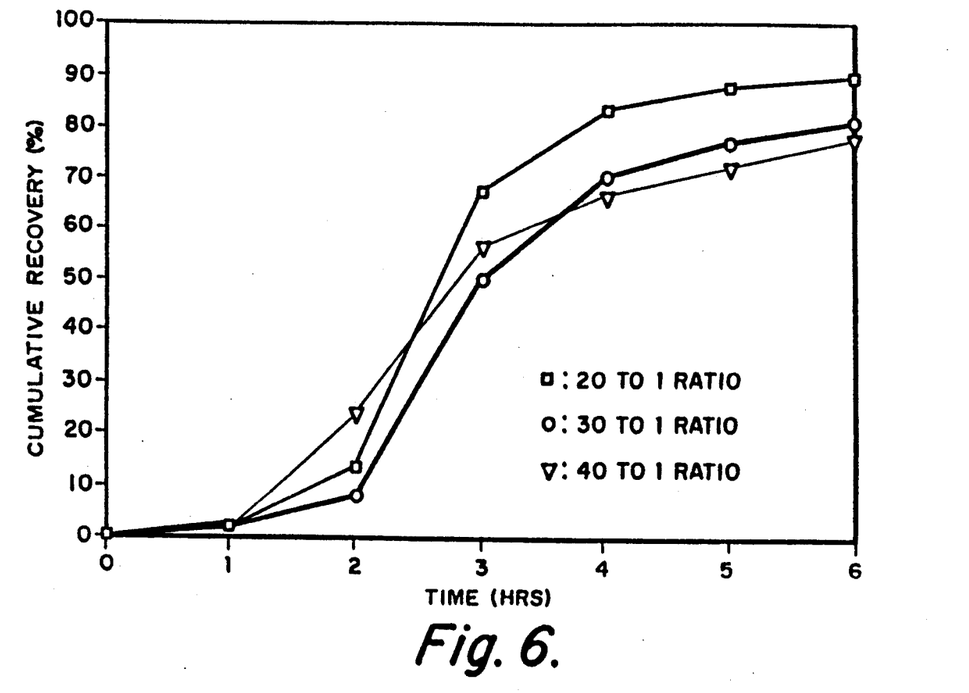
FIG. 6 is a set of three curves comparing cumulative rate of hydrocarbon oil recovery using various concentrations of fresh sodium silicate solution.

Experiments were conducted to determine the optimum and minimum percent of alkaline base required to process tar sands and to form the separation reagent. Four experiments were conducted in which the fresh treatment solution contains 20/1, 30/1, 40/1 and 200/1 by volume concentrations of sodium silicate. The cumulative rates of recovery are shown in FIG. 6.

After six hours of sonication, recovery rates were satisfactory for all concentrations except for the highest dilution. No significant bitumen oil recovery occurred with the 200/1 diluted solution. The rate of recovery appeared to increase with the increased concentration of fresh solution; this may be related to the rate of formation of the separation reagent. Once the reagent has been formed, its dilution and concentration become the controlling parameters. It is interesting to observe that it could be expected that after nine times usage, the 20/1 diluted sodium silicate solution should have the same bitumen separation activity of 200/1 diluted solution. However, the ten times reused solution exhibits significant activity while the 200/1 solution is inactive. This indicates that sodium silicate is not the active separation agent and that the agent is probably the in situ formed separation reagent.

Kinetic studies of bitumen separation were conducted. All cumulative recovery curves for the experiments performed so far resemble the S-shape characteristic rate curve. These curves are for the amount of reagent reacted versus time in a typical autocatalytic reaction. Important design criteria for the sonication reactor, such as temperature and retention time, can be generated from kinetic studies. Generally, two kinetic constants are necessary to mathematically fit the experimental data curve. One constant belongs to the first order reaction constant, the other constant belongs to the second order autocatalytic reaction. The differential rate equation for the autocatalytic reaction can be expressed as:

$$(dX/dt) = k_1(C_0 - X) + k_2(C_0 - X)X$$

In the process of the invention, X is the amount of bitumen recovered, $C_0$ is the total amount of recoverable bitumen (total organics) initially present in the tar sand, and $k_1$ and $k_2$ are the two reaction rate constants. The first term on the right hand side of the above equation is the elementary first-order equation. The second term describes the autocatalytic reaction as the product of the second rate constant ($k_2$), the remaining bitumen in the tar sand ($C_0 - X$) and the amount of bitumen recovered (X).

Figure 7:
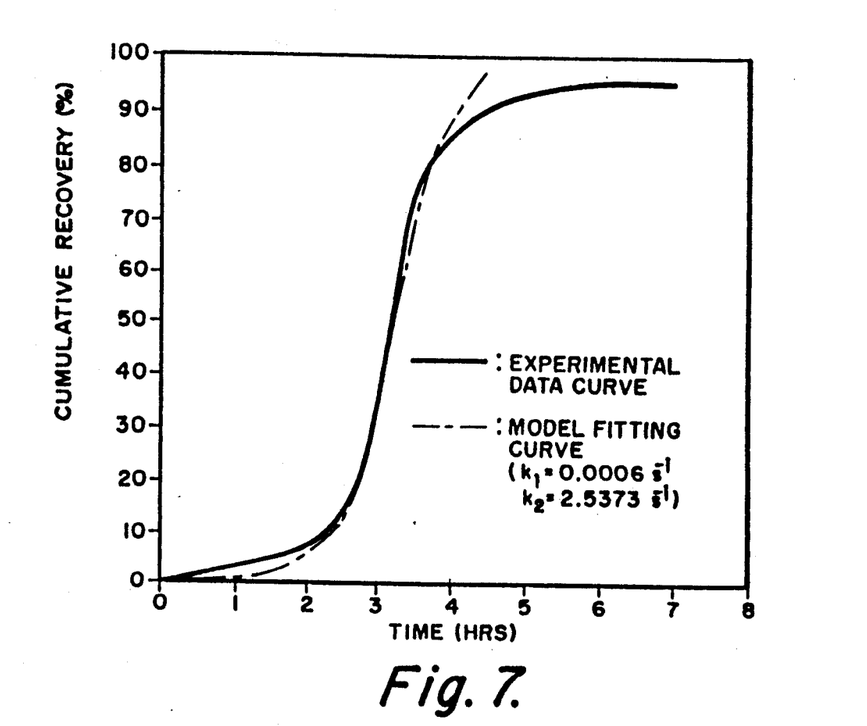
FIG. 7 is a model fitting curve for the rate of cumulative hydrocarbon oil recovery.

A set of experimental data was randomly selected to do the mathematical model fitting. The results of the curve fitting and the values for the two reaction rate constants are shown in FIG. 7. The value of the second order reaction constant ($k_2$) is larger than the first order reaction constant ($k_1$). This may be interpreted that the rate of autocatalytic reaction is fast once it gets started. In other words, the first order reaction is rate-limiting (the larger the $k_1$ value, the faster the recovery). Therefore, increasing the $k_1$ value should lead to faster initiation and recovery of bitumen.

A capital/operating cost study for a small demonstration plant (capacity of 1,000 barrels per day) was conducted to compare the production costs of bitumen produced in the demonstration plant with both the current bitumen market price and the cost of other alternative energy sources. All existing tar sand extraction processes produce bitumen at a cost per barrel above the market price varying from an estimated $35/bbl to $80/bbl.

Cost assumptions included a plant life of ten years. As a result of bench-scale experiments, the estimated fixed cost derived from the depreciation of plant and equipment plus startup expenses totalled approximately $1 per barrel for 3.6 million barrels produced. Estimates of other major costs incurred in the production of bitumen are the costs of mining, crushing, or purchasing the feedstock tar sands and other expendable process materials ($10 per barrel). The scale-up factor to a pilot (1,000 bpd) from bench scale would lower the cost per barrel for the sonication phase to approximately $1 per barrel. Allowing for labor and all other fixed and variable costs, gross operating profit margin would approximate $12 based on a $25/bbl price for bitumen at the plant site. It must also be considered that the bitumen produced would be priced even higher since it is of higher quality (lower impurity content) than extracts from other tar sand bitumen recovery processes.

Other advantages of the process of the invention are minimizing the cost and quantity of reagent since the effective separation reagent is produced in situ and is thereafter recycled in a diluted mode. In fact, an excess of separation reagent, generated by the process of this invention, could be sold at a profit for use in other carbonaceous material recovery processes. The process of the invention eliminates cost of organic solvents and attendant personnel hazards and environmental problems. There is no steam generation or high pressure or high temperature required in the extraction process. The necessity for pollution control and toxic control is minimal.

It is to be realized that only preferred embodiments of the invention have been described and that numerous substitutions, modifications and alterations are permissible without departing from the spirit and scope of the invention as defined in the following claims.

We claim:

1. A system for recovering a lighter, hydrocarbon liquid oil from: an asphaltene containing solid, carbonaceous material which contains metals comprising in combination:
    a vessel having a top and a bottom for receiving a suspension of the carbonaceous material in an aqueous solution of an inorganic base, said vessel having an upper liquid outlet near the top of the vessel and a lower solid particle outlet near the bottom of the vessel;
    ultra sonic generating means connected to the vessel for agitating the suspension to remove from the particles an organic phase which separates into a liquid hydrocarbon oil having a low metal content which rises to the top of the suspension and enters said liquid outlet and solid agglomerates containing a major portion of the asphaltene and a metal content higher than the liquid oil which fall to the bottom of the suspension; and
    means for recovering the agglomerate particles from the lower particle outlet.

2. A system according to claim 1 in which the material is tar sand and a mixture of said agglomerates and sand is recovered through the lower particle outlet and further including solid separation means receiving said mixture for separating the agglomerates from the sand.

3. A system according to claim 2 further including means for combusting the recovered asphaltene agglomerates.

4. A system according to claim 2 in which the separation means comprises sifting means for separating the mixture into sand and agglomerates.

5. A system according to claim 4 further including means for washing the recovered mixture of particles.

6. A system according to claim 4 further including means for drying the separated sand.

* * * * *